US009061576B2

(12) United States Patent
Kim et al.

(10) Patent No.: US 9,061,576 B2
(45) Date of Patent: Jun. 23, 2015

(54) HUB MOTOR AND STEERING SOLUTION (71) Applicant: Lit Motors Corporation, San Francisco, CA (US)

(72) Inventors: Daniel Kee Young Kim, Vancouver, WA (US); Eric Miller, Torrance, CA (US)

(73) Assignee: Lit Motors Corporation, San Francisco, CA (US)

( * ) Notice: Subject to any disclaimer, the term of this patent is extended or adjusted under 35 U.S.C. 154(b) by 0 days.

(21) Appl. No.: 13/777,941

(22) Filed: Feb. 26, 2013

(65) Prior Publication Data

US 2013/0233632 A1    Sep. 12, 2013

Related U.S. Application Data (60) Provisional application No. 61/603,881, filed on Feb. 27, 2012, provisional application No. 61/603,883, filed on Feb. 27, 2012.

(51) Int. Cl.
| | |
|---|---|
| *B62K 7/00* | (2006.01) |
| *B60K 7/00* | (2006.01) |
| *B62M 7/12* | (2006.01) |
| *B62D 7/00* | (2006.01) |
| *H02K 7/116* | (2006.01) |
| *H02K 21/16* | (2006.01) |
| *H02K 21/26* | (2006.01) |
| *H02K 3/28* | (2006.01) |
| *H02K 7/14* | (2006.01) |
| *H02K 16/04* | (2006.01) |

(52) U.S. Cl.
CPC .............. *B60K 7/0007* (2013.01); *B62M 7/12* (2013.01); *B62D 7/00* (2013.01); *H02K 7/1163* (2013.01); *B62K 2202/00* (2013.01); *H02K 21/16* (2013.01); *H02K 21/26* (2013.01); *H02K 3/28* (2013.01); *H02K 7/14* (2013.01); *H02K 16/04* (2013.01)

(58) Field of Classification Search
CPC ..... B62K 2204/00; B62K 11/00; B62M 7/00; B62M 7/12
USPC .................. 180/220, 219, 223, 224
See application file for complete search history.

(56) References Cited

U.S. PATENT DOCUMENTS

| | | | | |
|---|---|---|---|---|
| 5,485,893 | A | * | 1/1996 | Summers ...................... 180/219 |
| 5,813,487 | A | * | 9/1998 | Lee et al. ..................... 180/65.1 |
| 5,960,901 | A | * | 10/1999 | Hanagan ....................... 180/210 |
| 6,270,103 | B1 | * | 8/2001 | Grimm .......................... 280/270 |

(Continued)

*Primary Examiner* — Joseph Rocca
*Assistant Examiner* — Michael Stabley
(74) *Attorney, Agent, or Firm* — Blakely, Sokoloff, Taylor & Zafman (57) ABSTRACT

Embodiments of the invention describe vehicles including a wheel (e.g., a front wheel or wheels), a wheel hub, a motor included in the wheel hub to transmit power to the wheel, one or more rolling bearings to support the wheel hub and having one or more rolling elements to enable rolling of the wheel, and a steering axle placed within the wheel hub for steering the wheel. Embodiments also describe a wheel (e.g., a rear wheel or wheels), a wheel hub, a motor included in the wheel hub to transmit power to the wheel, and a swing arm assembly having a first and a second end, the first end rotatably coupled to a steering axle, the second end coupled to the motor. As described below, embodiments of the invention decrease volume necessary for a vehicle's drivetrain, while not adversely affecting the potential for vehicle interior volume and vehicle maneuverability.

20 Claims, 8 Drawing Sheets

(56) References Cited

U.S. PATENT DOCUMENTS

| | | | |
|---|---|---|---|
| 6,321,863 B1* | 11/2001 | Vanjani | 180/65.51 |
| 6,719,081 B2* | 4/2004 | Liao et al. | 180/220 |
| 6,971,467 B2* | 12/2005 | Katsaros | 180/206.5 |
| 7,398,846 B2* | 7/2008 | Young et al. | 180/65.51 |
| 7,575,106 B2* | 8/2009 | Matsueda | 188/218 R |
| 7,828,101 B2* | 11/2010 | Radtke et al. | 180/206.5 |
| 7,938,210 B2* | 5/2011 | Kunzler et al. | 180/65.51 |
| 8,727,051 B2* | 5/2014 | Schmid et al. | 180/65.31 |
| 8,751,076 B2* | 6/2014 | Hennings | 701/22 |
| 2003/0213630 A1* | 11/2003 | Pyntikov et al. | 180/220 |
| 2004/0160030 A1* | 8/2004 | Walters et al. | 280/124.106 |
| 2005/0029033 A1* | 2/2005 | Rip et al. | 180/220 |
| 2005/0167171 A1* | 8/2005 | Katsaros | 180/206.5 |
| 2006/0048994 A1* | 3/2006 | Young et al. | 180/402 |
| 2006/0065452 A1* | 3/2006 | Tomoshige et al. | 180/65.1 |
| 2006/0102404 A1* | 5/2006 | Katsaros | 180/205 |
| 2006/0283644 A1* | 12/2006 | Matsueda | 180/205 |
| 2007/0187162 A1* | 8/2007 | Katsaros | 180/65.5 |
| 2008/0023237 A1* | 1/2008 | Houle | 180/65.2 |
| 2008/0093913 A1* | 4/2008 | Katsaros | 301/1 |
| 2010/0282528 A1* | 11/2010 | Palti | 180/65.1 |
| 2011/0048830 A1* | 3/2011 | Radtke et al. | 180/205 |
| 2011/0168466 A1* | 7/2011 | Starr | 180/65.51 |
| 2011/0169381 A1* | 7/2011 | Calley et al. | 310/67 R |
| 2011/0192666 A1* | 8/2011 | Schmid et al. | 180/165 |
| 2011/0196556 A1* | 8/2011 | Hennings | 701/22 |
| 2012/0012412 A1* | 1/2012 | Moeller et al. | 180/206.2 |
| 2012/0013103 A1* | 1/2012 | Marion | 280/639 |
| 2012/0133195 A1* | 5/2012 | Yun et al. | 301/6.5 |
| 2012/0149517 A1* | 6/2012 | Ko et al. | 475/5 |
| 2012/0303193 A1* | 11/2012 | Gresser | 701/22 |
| 2012/0318601 A1* | 12/2012 | Kuroki | 180/220 |
| 2013/0015009 A1* | 1/2013 | Lin et al. | 180/220 |
| 2013/0153311 A1* | 6/2013 | Huntzinger | 180/55 |

\* cited by examiner

HUB MOTOR AND STEERING SOLUTION

CLAIM OF PRIORITY

This application claims priority to Provisional Application No. 61/603,881 filed on Feb. 27, 2012 and to Provisional Application No. 61/603,883 filed on Feb. 27, 2012.

FIELD OF THE INVENTION

Embodiments of the invention generally pertain to transportation vehicles, and more particularly to motors utilized in transportation vehicles.

BACKGROUND

As the demand increases for alternative vehicles such as hybrid, electric, and fuel cell vehicles, existing technical solutions have become limiting factors in the efficiency of vehicle design. For example, in hybrid vehicles, an electrical motor is used for low-speed conditions when high amounts of torque are needed, while a separate gas engine is used in high-speed conditions when engine efficiency is desired. The use of two engines increases the space needed for the vehicle's power solution, thereby decreasing the interior volume of the vehicle.

Furthermore, as the demand increases for higher efficiency vehicles, it becomes important to minimize vehicle weight and maximize vehicle interior volume. Current solutions to decrease vehicle drivetrain volume tend to significantly degrade vehicle handling, decrease corner entrance and exit speeds and reduce traction in inclement environmental conditions such as rain or snow. What is needed is a solution to decrease the volume necessary for a vehicle's drivetrain, while also increasing the potential for vehicle interior volume and vehicle maneuverability.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DESCRIPTION

Embodiments of the invention describe methods, systems and apparatuses utilizing a motor having a rotor assembly and a stator assembly to rotatably drive the rotor assembly to multiple variable operating ranges.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1A:
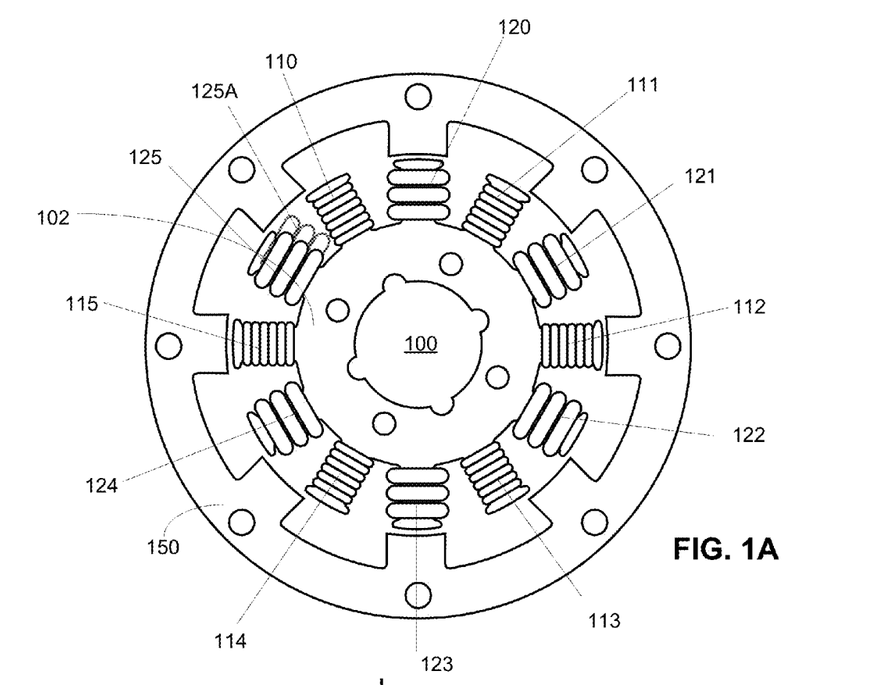
FIG. 1A is an illustration of a rotor and stator assembly according to an embodiment of the invention.

FIG. 1A is an illustration of a rotor and stator assembly according to an embodiment of the invention. FIG. 1A illustrates rotor assembly 150 to rotate around (i.e., external to) stator assembly 100. Said stator assembly includes body 102 and a plurality of teeth (alternatively referred to herein as stator poles) extending radially outward from the body. In this example, said plurality of teeth is shown comprise teeth 110-115 and teeth 120-125.

Motors utilizing rotating and stationary components, such as rotor assembly 150 and stator assembly 100, may use a magnetic field to convert electrical energy into mechanical energy according to the motor principle or to convert mechanical energy into electrical energy according to the generator principle.

For example, a stator component of an electrical motor may comprise of a stack of metal plates, forming a yoke and a number of teeth. In the slots between these teeth, an electrical winding may be provided, which comprises of a number of coils. When current flows through this winding, it produces the magnetic field of the electrical motor. The rotor component of said electrical motor may comprise, for example, of a stack of plates, on which a number of magnets (e.g., permanent magnets) are mounted.

In this embodiment, stator assembly 100 includes and at least two winding sets, each winding set comprising coils wound on the teeth of the stator assembly. As shown in FIG. 1A, the windings on teeth 110-115 comprise a first set for driving rotor assembly 150 to a first variable operational range, and the windings on teeth 120-125 comprise a second set for driving rotor assembly 150 to a second variable operational range different than the first.

In this example, the first set of windings comprises a first number of coils wound on teeth 110-115, and the second set of windings comprises a second number of coils, less than the first number, wound on teeth 120-125. The first and second sets of windings are also shown to be wound on alternating teeth of stator assembly 100.

In some embodiments, the above described first and second variable operational ranges comprise rotor speeds (e.g., the first range may be for 0-500 RPMs, while the second range may be for 500+ RPMs). In other embodiments, the first and second operational ranges comprise power efficiency ranges (e.g., the power-in/power-out percentage of the first range may be 85%, while the power-in/power-out percentage of the second range may be 90%).

In some embodiments, stators have redundant windings to ensure operation of the electrical motor in the event of a failure or one of the windings. For example, in FIG. 1A, the coils wound on teeth 120-125 are shown to include a redundant set—e.g., redundant winding 125A on tooth 125. In other embodiments, said redundant windings may comprise another winding set on a separate tooth.

In some embodiments, stator assembly 100 and rotor assembly 150 may be used in a flywheel motor in vehicular energy storage applications having multiple operating modes. Each of these modes has different requirements and creating an appropriate singular design in order to meet all of these modes does not exist in prior art solutions (i.e., separate stator assemblies, such as prior art stators 190 and 195 of FIG. 1B would have to be utilized; however, in some embodiments of the invention, stator assemblies such as stators 190 or 195 comprise the above described redundant set of windings). The different sets of windings on teeth 110-115 and 120-125 comprises more than one set of coil windings, each with different parameters to allow for better meeting each of these modes.

Figure 1B:
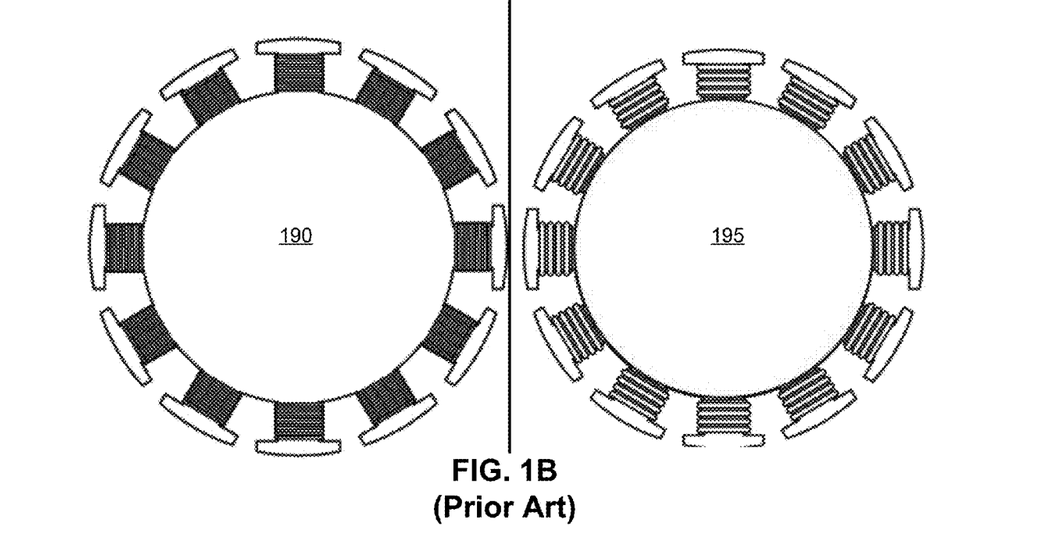
FIG. 1B is an illustration of prior art stator assemblies.

For example, one mode may be a start-up/energy injection/energy recovery mode (i.e., the mode accomplished by the windings similar to that on prior art stator assembly 195 and on teeth 120-125 of stator assembly 100). The requirements for optimal work in this mode include the ability to transmit very large amounts of power quickly. One way of achieving this is to use larger diameter wires with fewer turns per stator pole/teeth. A second mode is a low power, high speed, low change mode. For this mode, smaller diameter wires with more windings may be optimal (i.e., by windings similar to that on prior art stator assembly 190 and on teeth 110-115 of stator assembly 100). In some embodiments, multiple modes may be formed on a wheel having a quantity of stator teeth divisible by six (e.g., twelve stator teeth for two modes of operation, as shown in motor 100, eighteen stator teeth for three modes of operation, etc.). There are other possible modes besides the above described example, and a level of granularity in other embodiments may be achieved by using multiple sets of windings around the same stator teeth, or by having non-connected sets around adjacent or non-adjacent teeth.

Figure 2:
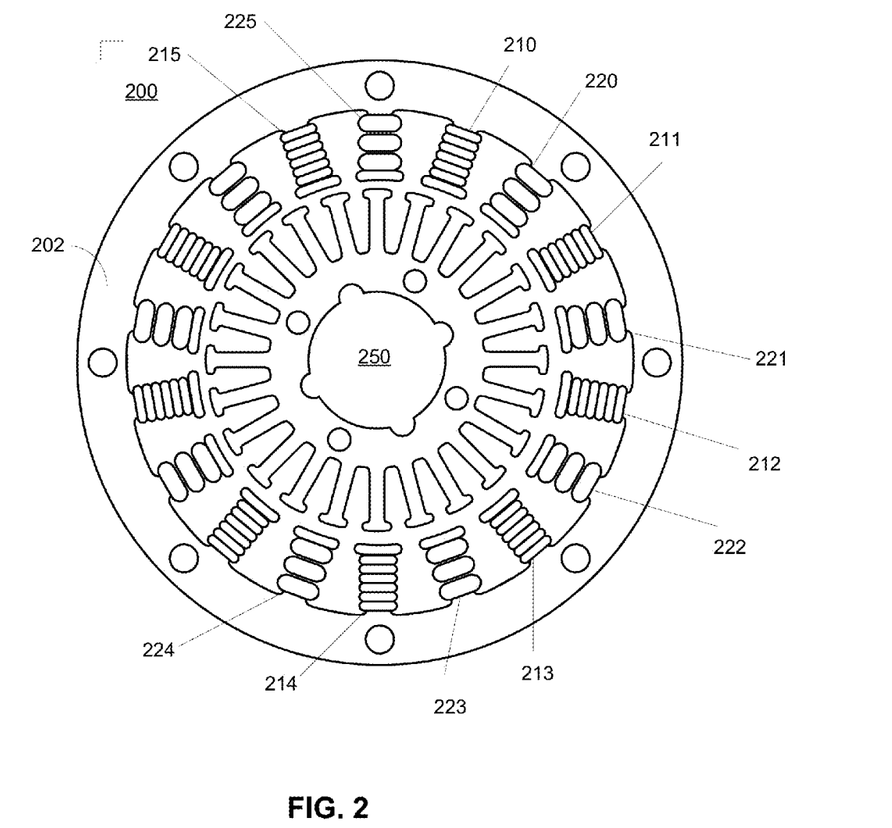
FIG. 2 is an illustration of a rotor and stator assembly according to an embodiment of the invention.

FIG. 2 is an illustration of a rotor and stator assembly according to an embodiment of the invention. In this embodiment, rotor assembly 250 is configured to rotate within (i.e., internal to) stator assembly 200. Said stator assembly includes body 202, a plurality of teeth (alternatively referred to herein as stator poles) extending radially inward from the body. In this example, said plurality of teeth is shown comprise teeth 210-215 and teeth 220-225.

In this embodiment, stator assembly 200 includes and at least two winding sets, each winding set comprising coils wound on the teeth of the stator assembly. As shown in FIG. 2, the windings on teeth 210-215 comprise a first set for driving rotor assembly 250 to a first variable operational range, and the windings on teeth 220-225 comprise a second set for driving rotor assembly 250 to a second variable operational range different than the first.

In this example, the first set of windings comprises a first number of coils wound on teeth 210-215, and the second set of windings comprises a second number of coils, less than the first number, wound on teeth 220-225. The first and second sets of windings are also shown to be wound on alternating teeth of stator assembly 200. Other embodiments may include more than two sets of different windings, multiple sets of windings around the same stator teeth, or by having non-connected sets around adjacent or non-adjacent teeth.

Figure 3:
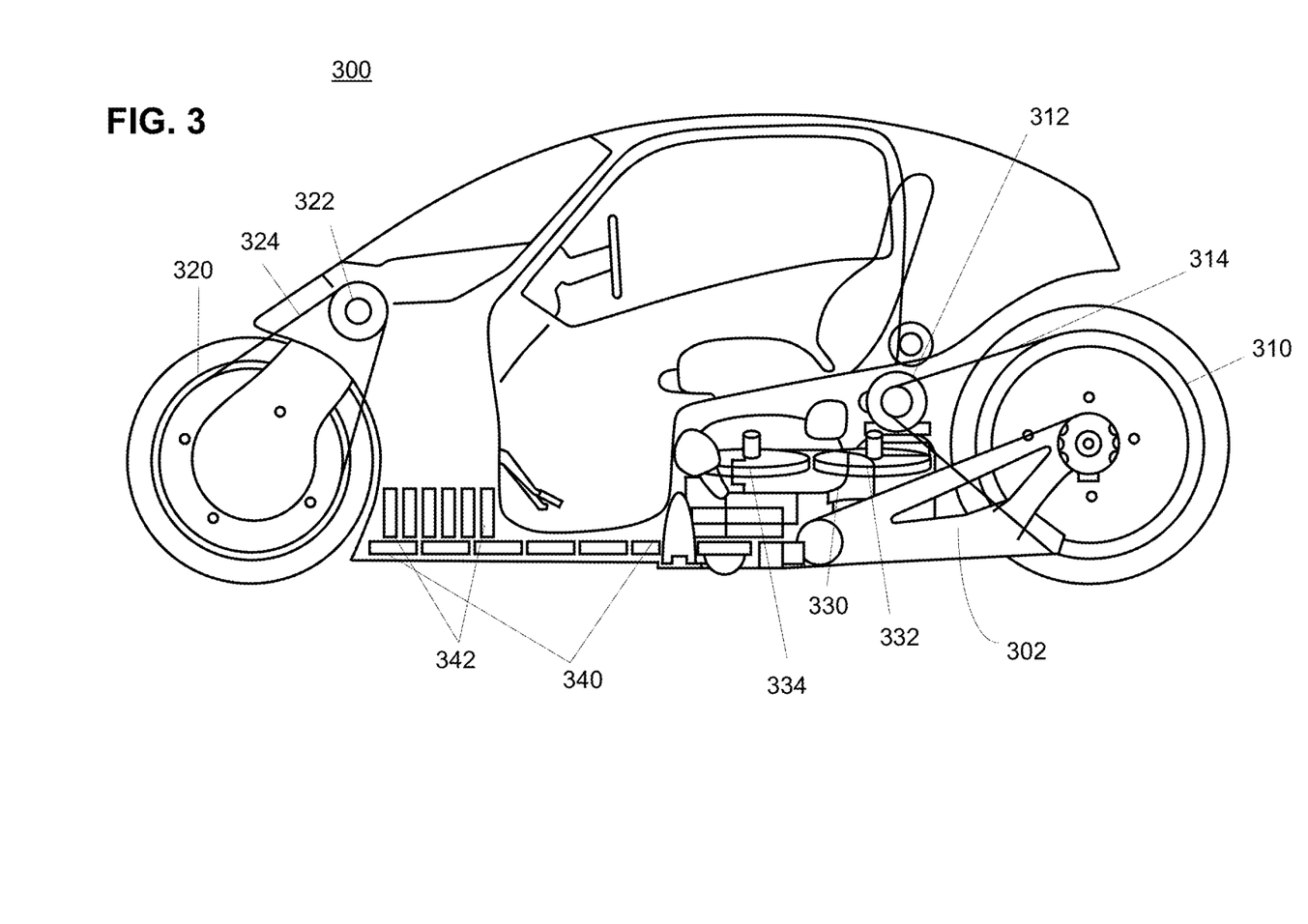
FIG. 3 illustrates an inline two-wheeled vehicle incorporating one or more an embodiments of the invention.

FIG. 3 illustrates an inline two-wheeled vehicle incorporating one or more embodiments of the invention. In this embodiment, vehicle 300 comprises vehicle frame 302, and further includes first and second drive wheels 310 and 320. First and second drive wheels motor generators 312 and 322 are coupled to drive wheels 310 and 320, respectively, through drive chains 314 and 324, respectively. In alternative embodiments, said drive wheel motors may comprise in-wheel hub motors that do not use said drive chains. Drive wheel motor generators may each comprise a motor having an embodiment of the rotor and stator assemblies described above.

In this embodiment, gyro stabilizing unit 330 is coupled to vehicle 300 through vehicle frame 302. Gyro stabilizer 330 may include first and second gyro assemblies housing flywheels 332 and 334; said flywheels may differ in size and material composition, or may be substantially identical. Said first and second gyro assemblies may further house flywheel motor-generators to drive their respective flywheels. These flywheel-motor generators may each comprise a motor having an embodiment of the rotor and stator assemblies described above.

In this embodiment, vehicle 300 further includes an energy storage unit having battery bank 340, capacitor bank 342, and a power switching circuit in electrical communication with battery bank 340, capacitor bank 342, and any of the above described drive wheel motor-generators and flywheel motor-generators having an embodiment of the rotor and stator assemblies described above. The power switching circuitry may control the multiple operating modes of the motors utilizing rotor and stator assemblies according to embodiments of the invention—e.g., vehicular energy storage applications utilizing the multiple operating modes enabled by said stator assemblies. In other embodiments, said power switching circuitry may comprise digital logic, a processor-executed software module stored on a computer readable medium, or any combination of circuitry, logic and modules.

Embodiments of the invention describe methods, systems and apparatuses utilizing a wheel hub to include a wheel and a motor included in the wheel hub to transmit power to the wheel. As described below, embodiments of the invention decrease vehicle drivetrain volume and increase the potential for vehicle interior volume, while not adversely affecting vehicle maneuverability.

Figure 4A:
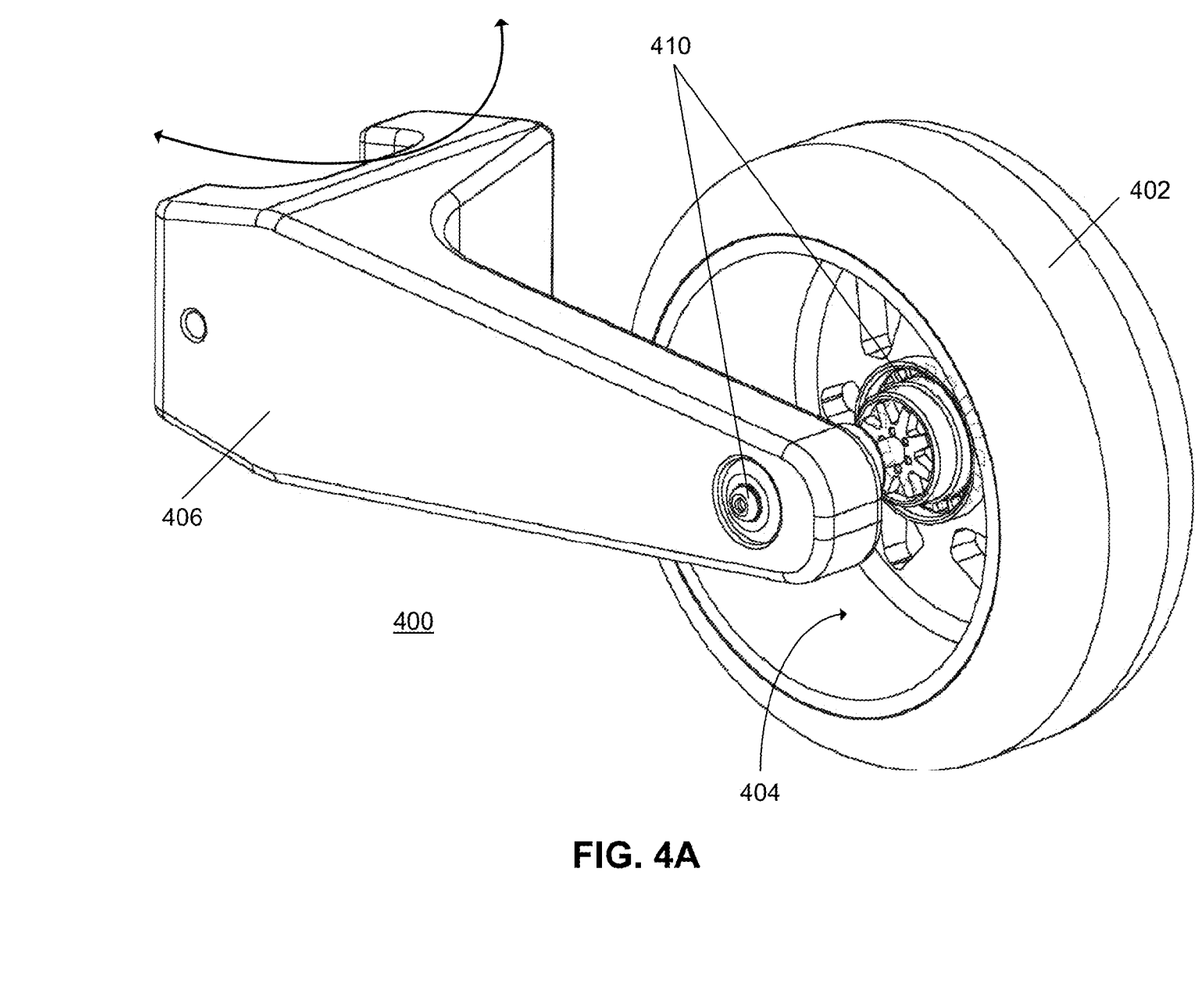
FIG. 4A and FIG. 4B illustrate a drive wheel motor according to an embodiment of the invention.
Figure 4B:
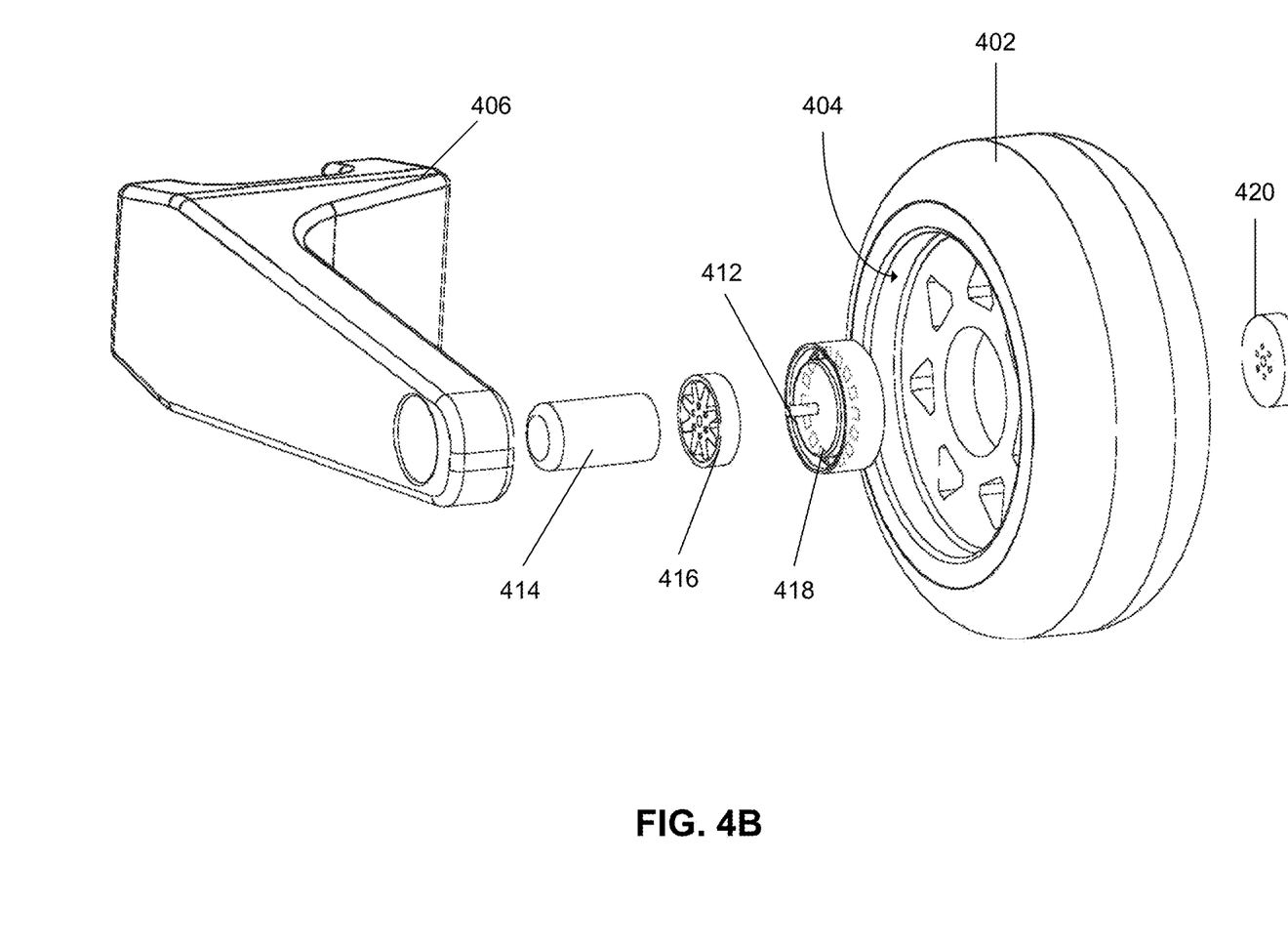

FIG. 4A and FIG. 4B illustrate a drive wheel motor according to an embodiment of the invention. In this embodiment, apparatus 400 is shown in FIG. 4 to include wheel 402, wheel hub 404, and swing arm assembly 406 coupled to the wheel and the wheel hub. In this embodiment, wheel 402 comprises a rear wheel of a vehicle; in other similar embodiments, wheel 402 may comprise a front wheel of a vehicle. Swing arm assembly 406 is shown to couple to a vehicle frame is an oscillating manner, allowing a user to "turn" rear wheel 402—i.e., the rear wheel moves in response to a vehicle's steering system. Thus, vehicle maneuverability is significantly increased by having the rear wheel turn in conjunction with any front wheel maneuverability (e.g., swing arm assembly 406 allows for corrective steering capability).

In this embodiment, wheel hub 404 is shown to include motor 410 included in the wheel hub to transmit power to wheel 402. While illustrated to apply force to a single wheel, in other embodiments, a drive wheel motor may be configured to apply force to a plurality of wheels (e.g., an embodiment where swing arm assembly comprises a double-sided swing arm assembly, having a wheel on each side). FIG. 4B illustrates the components of motor 410, including axle 412, axle case 414, stator 416 and rotor 418. Axle case 414 is fixedly secured to swing arm 406, and axle 412 is rotatably supported in the axle case through bearing members (not shown).

In this embodiment, stator 416 and rotor 418 are shown to generate the rotational force applied to wheel 402. For example, a stator component of an electric motor may comprise of a stack of metal plates, forming a yoke and a number of teeth. In the slots between these teeth, an electrical winding may be provided, which comprise of a number of coils. When current flows through this winding, it produces the magnetic field of the electric motor, which causes the rotor assembly to rotate. The rotor component of said electric motor may comprise, for example, of a stack of plates, on which a number of magnets (e.g., permanent magnets) are mounted. Power transmission member 420 is shown to provide a controlled application of the rotational power of motor 410 to wheel 402.

Thus, in this embodiment, by allowing the rear wheel to turn in response to a vehicle's steering system, vehicle maneuverability is significantly increased. Furthermore, having motor 410 included in wheel hub 404 allows the vehicle drive motor system to not adversely affect the interior volume of the vehicle.

FIG. 5A-FIG. 5E illustrate a drive wheel motor according to an embodiment of the invention. In this embodiment, a center hub steering mechanism with an integrated wheel hub motor (e.g., an electric motor) is shown to couple a front wheel to a vehicle frame.

Figure 5A:
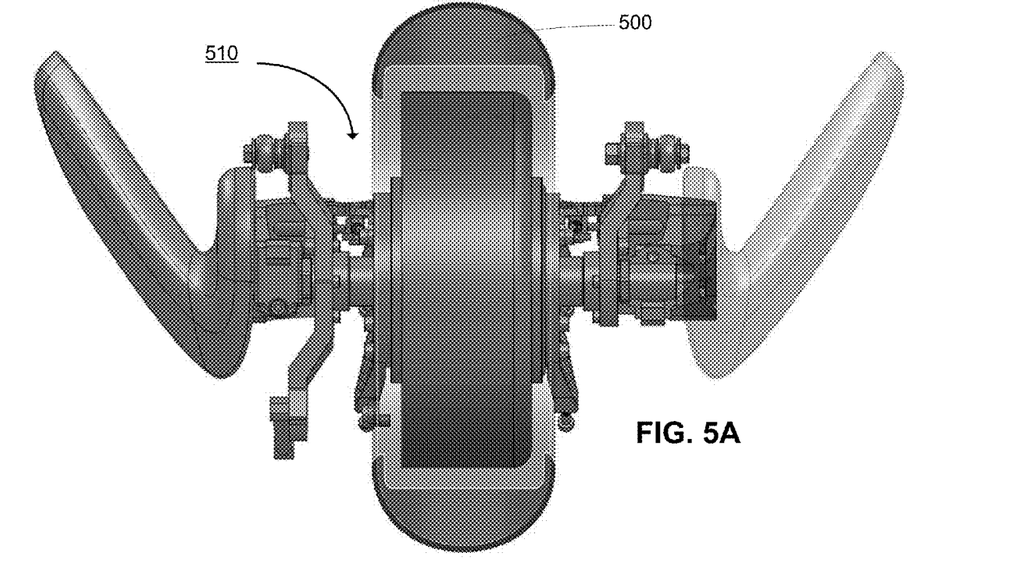
FIG. 5A-FIG. 5E illustrate a drive wheel motor according to an embodiment of the invention.

As shown in FIG. 5A, wheel 500 comprises a front wheel of a vehicle coupled to a vehicle frame via a center axle of hub motor and steer assembly 510; in other similar embodiments, wheel 500 may comprise a rear of a vehicle. As described below, in this embodiment the center axle does not spin; a wheel drive motor (described below) applies rotational force to front wheel 500, and is coupled to the center axle via a plurality of bearings so as to not apply rotational force to the axle. Therefore, the center axle may be used for steering (and is thus alternatively referred to herein as a "steering axis").

Figure 5B:
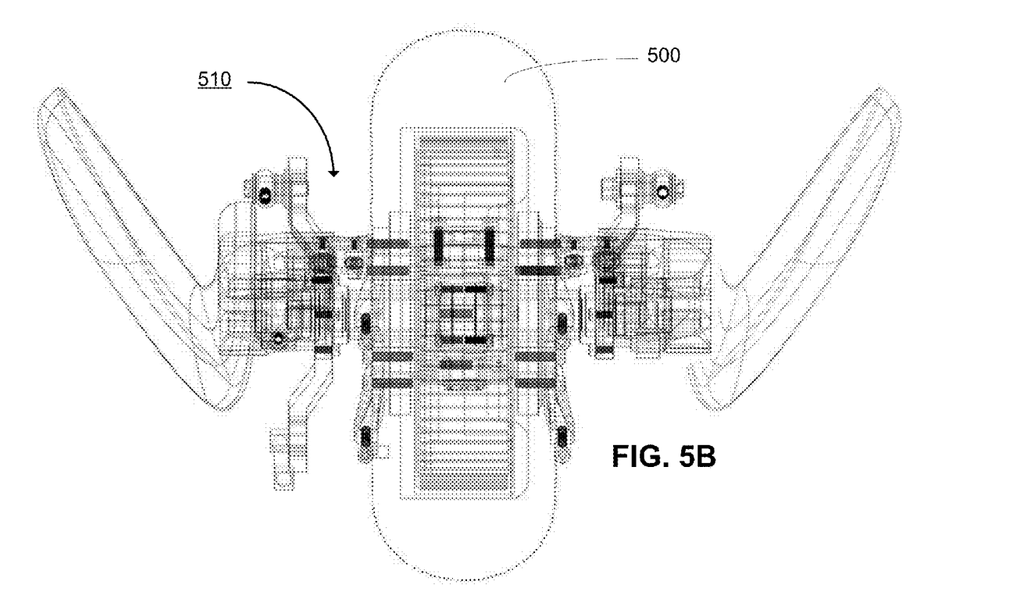

The hub of front wheel 500 is shown in the cross-sectional illustration of FIG. 5B to include hub motor and steer assembly 510 to apply rotational force to wheel 500. Hub-center motor and steering systems according to embodiments of the invention use an arm, or arms, on bearings to allow upward wheel deflection integrated with the suspension system. The electric motor/generator windings and armature are part of the wheel and the hub which generates electricity. While illustrated to apply force to a single wheel, in other embodiments, said drive wheel motor may be configured to apply force to a plurality of wheels. Furthermore, as described below, embodiments of the invention may be further used as part of an energy recovery system for the vehicle.

Figures 5C, 5D:
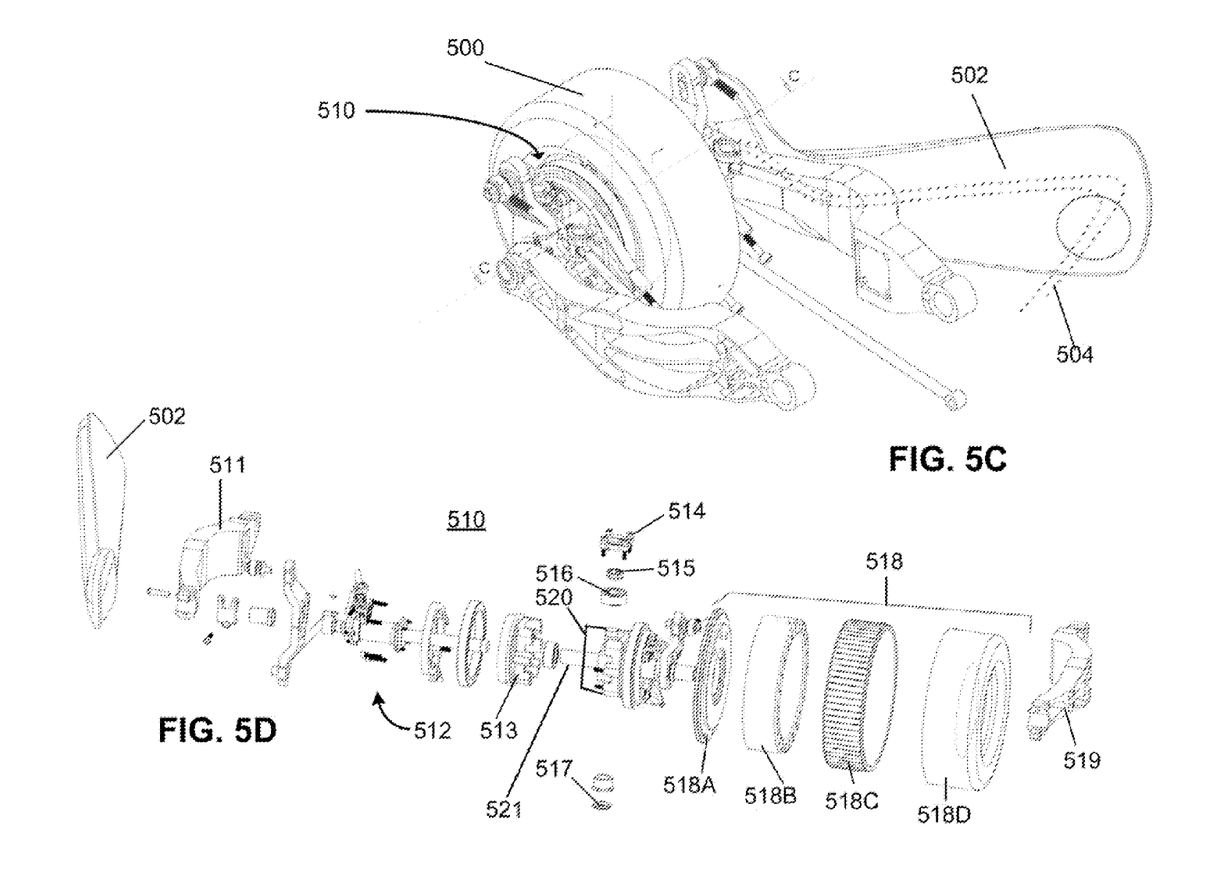
Figure 5E:
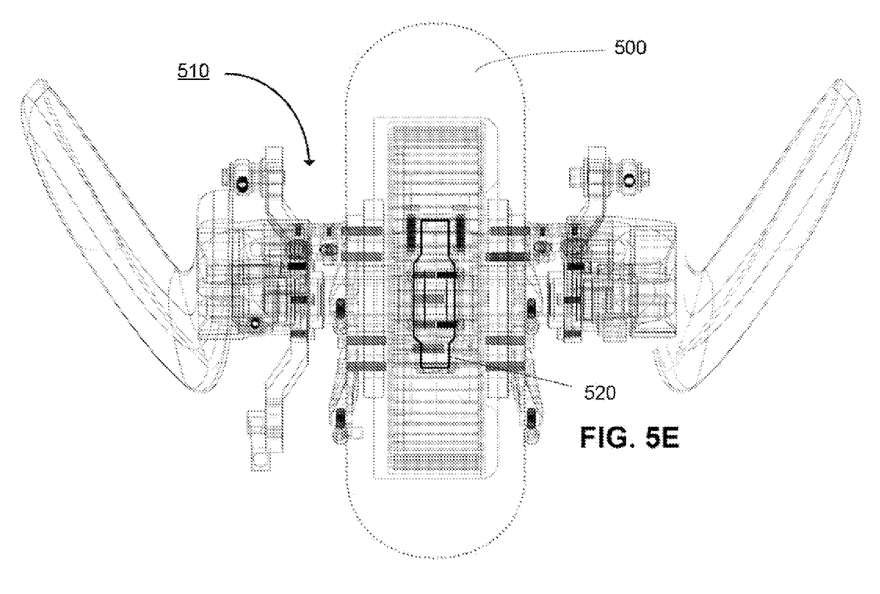

FIG. 5C illustrates hub motor and steer assembly 510 and suspension assembly 502. In this embodiment, the braking system for wheel 500 is controlled via brake actuator module integrated into a cover/housing of suspension assembly 502. FIG. 5C further illustrates cables 504, which may comprise hub-motor cables and actuator module-to-actuator control unit (not shown) cables. Thus, suspension arm assembly 502 may comprise a suspension arm cover housing a plurality of power supply cables, brake/steering activator modules or redundant mechanical braking systems.

FIG. 5C and FIG. 5D illustrate components 511-519 of hub motor and steer assembly 510. In this embodiment, hub motor and steer assembly 510 is shown to include first suspension arm 511, four bar linkage mount 512, wheel bearing 513, spindle cap 514, spindle bearing 515, hub spindle 516, spindle cap 517, vertical axle 520, horizontal axle 521 (which does not spin relative to the wheel 500), electric motor 518 and second suspension arm 519. The vertical axle 520 is also illustrated in the cross-sectional illustration of FIG. 5E. Said suspension arms may also comprise the above described swing arms (e.g., swing arm assembly 106 of FIG. 1). Electric motor 518 is shown to further comprise stator assembly 518A, coils/power electronics/inverters 518B, permanent magnets 518C, and rotor 518D. Said stator and rotor assemblies generate the rotational force to be applied to wheel 500. A power transmission member (not shown) may be utilized to provide a controlled application of the rotational power of motor 510 to wheel 500.

In some embodiments, in-hub electric motors such as the front and rear wheel embodiments discussed above may act as traction motor and part of the regenerative braking system in a two-wheeled, self-balancing vehicle (e.g., the vehicle described above and illustrated in FIG. 3). In other embodiments, said electric motor may act solely as a traction motor. For all embodiments, the use of one or more in-hub electric motors significantly reduces the amount of space within a vehicle frame that is dedicated for drive motor storage without degrading vehicle handling, without adversely affecting corner entrance and exit speeds, and without reducing traction in inclement environmental conditions such as rain or snow.

Thus, in reference to FIG. 3, first and second drive wheels motor generators 312 and 322 may each be included in the hubs of drive wheels 310 and 320, respectively, and may comprise any electric motor embodiments described above (and thus, not use drive chains 314 and 324). For example, drive wheel motor 322 may comprise the front wheel motor illustrated in FIG. 5A-2D, and drive wheel motor 312 may comprise the steerable rear-wheel motor illustrated in FIG. 4A-4B.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

The invention claimed is:

1. An apparatus for use in a vehicle comprising:
a wheel comprising a front or a rear wheel;
a wheel hub;
one or more rolling bearings to support the wheel hub and having one or more rolling elements to enable spinning of the wheel;
a steering axle placed within the wheel hub for steering the wheel and fixedly coupled to not spin relative to the wheel;
a vertical axle, wherein the wheel is to rotate around the vertical axle, wherein the steering axle comprises a horizontal axle;
a gyroscope-stabilizer, including a flywheel and a flywheel motor-generator to transfer energy to and from the flywheel;
a capacitor bank including a battery; and
a power controller to:
transfer energy from the flywheel motor-generator to the capacitor bank in response to detecting an input to increase the speed of the vehicle; and
transfer energy from a wheel drive motor of the vehicle to the capacitor bank in response to detecting an input to decrease the speed of the vehicle.

2. The apparatus of claim 1, further comprising:
the wheel drive motor, wherein the wheel drive motor is included in the wheel hub to transmit power to the wheel, the wheel drive motor to include a rotor component, wherein the wheel and the rotor component of the wheel drive motor are to rotate about the steering axle.

3. The apparatus of claim 1, wherein the wheel hub includes at most one wheel.

4. The apparatus of claim 2, further comprising:
a suspension arm assembly including a cover housing to further include at least one of a plurality of power supply cables for the wheel drive motor, brake activator modules, steering activator modules, or redundant mechanical braking systems.

5. The apparatus of claim 1, wherein the wheel comprises a rear wheel, and the apparatus further comprises:
a vehicle frame; and
a swing arm assembly having a first and a second end, the first end rotatably coupled to the vehicle frame for steering the rear wheel, the second end coupled to the wheel drive motor.

6. The apparatus of claim 5, wherein the swing arm assembly comprises a single sided swing arm assembly.

7. The apparatus of claim 6, wherein the wheel hub includes at most one rear wheel.

8. The apparatus of claim 5, wherein the swing arm assembly comprises a double sided swing arm assembly.

9. The apparatus of claim 8, wherein the wheel hub includes a plurality of rear wheels.

10. The apparatus of claim 5, wherein the swing arm assembly comprises a cover housing to include at least one of a plurality of power supply cables for the wheel drive motor, brake activator modules, steering activator modules, or redundant mechanical braking systems.

11. A vehicle comprising:
   a frame;
   a front wheel and a rear wheel;
   a wheel hub for the front or the rear wheel;
   one or more rolling bearings to support the wheel hub and having one or more rolling elements to enable spinning of the front or the rear wheel;
   a steering axle placed within the wheel hub for steering the front or the rear wheel and fixedly coupled to not spin relative to the respective wheel;
   a vertical axle, wherein the front or the rear wheel is to rotate about the vertical axle, wherein the steering axle comprises a horizontal steering axle;
   a gyroscope-stabilizer, including a flywheel and a flywheel motor-generator to transfer energy to and from the flywheel;
   a capacitor bank including a battery;
   a power controller to:
      transfer energy from the flywheel motor-generator to the capacitor bank in response to detecting an input to increase the speed of the vehicle; and
      transfer energy from a wheel drive motor of the vehicle to the capacitor bank in response to detecting an input to decrease the speed of the vehicle;
   a suspension arm assembly for the front wheel; and
   a swing arm assembly for the rear wheel having a first and a second end, the first end rotatably coupled to the vehicle frame for steering the rear wheel, the second end coupled to the wheel drive motor.

12. The vehicle of claim 11, wherein the wheel hub includes the wheel drive motor to transmit power to the front or the rear wheel, the wheel drive motor to include a rotor component, wherein the wheel and the rotor component are to rotate about the steering axle.

13. The vehicle of claim 11, wherein the wheel hub includes at most one wheel.

14. The vehicle of claim 11, wherein the swing arm assembly comprises a single sided swing arm assembly.

15. The vehicle of claim 14, wherein the rear wheel comprises at most one wheel.

16. The vehicle of claim 11, wherein the swing arm assembly comprises a double sided swing arm assembly.

17. The vehicle of claim 16, wherein the rear wheel comprises a plurality of wheels.

18. The vehicle of claim 12, wherein at least one of the suspension arm assembly or the swing arm assembly comprises a cover housing to include at least one of power supply cables for the wheel drive motor, brake activator modules, steering activator modules, or redundant mechanical braking systems for the respective wheel.

19. The vehicle of claim 12, wherein the wheel drive motor comprises a front wheel drive motor, and the vehicle further comprises a rear wheel drive motor.

20. The vehicle of claim 11, wherein the input to decrease the speed of the vehicle comprises an input to engage a braking system of the vehicle, the braking system to generate energy transferrable to the capacitor bank.

* * * * *